United States Patent [19]

Elangovan et al.

[11] Patent Number: 5,480,738
[45] Date of Patent: Jan. 2, 1996

[54] FUEL CELL MODULE

[75] Inventors: Singaravelu Elangovan, Sandy; Ashok C. Khandkar, Salt Lake City; Joseph J. Hartvigsen, Kaysville, all of Utah

[73] Assignee: Ceramatec, Inc., Salt Lake City, Utah

[21] Appl. No.: 192,416

[22] Filed: Feb. 4, 1994

[51] Int. Cl.⁶ .................................................. H01M 8/04
[52] U.S. Cl. ............................................. 429/32; 429/38
[58] Field of Search .................................... 429/32, 38, 39

[56] References Cited

U.S. PATENT DOCUMENTS

| | | |
|---|---|---|
| 3,394,032 | 7/1968 | Danner . |
| 3,488,224 | 1/1970 | Craig . |
| 4,254,086 | 3/1981 | Sanders . |
| 4,476,196 | 10/1984 | Poeppel et al. . |
| 4,476,197 | 10/1984 | Herceg . |
| 4,490,444 | 12/1984 | Isenberg . |
| 4,496,373 | 1/1985 | Behr et al. . |
| 4,499,663 | 2/1985 | Zwick et al. . |
| 4,510,212 | 4/1985 | Fraioli . |
| 4,640,875 | 2/1987 | Makiel ............................ 429/30 |
| 4,647,516 | 3/1987 | Matsumura et al. . |
| 4,650,727 | 3/1987 | Vanderborgh et al. . |
| 4,664,987 | 5/1987 | Isenberg . |
| 4,721,556 | 1/1988 | Hsu . |
| 4,729,931 | 3/1988 | Grimble . |
| 4,732,822 | 3/1988 | Wright et al. ..................... 429/34 |
| 4,750,918 | 6/1988 | Sirkar . |
| 4,753,857 | 6/1988 | Hosaka ............................ 429/38 |
| 4,761,349 | 8/1988 | McPheeters et al. ................ 429/39 |
| 4,791,035 | 12/1988 | Reichner . |
| 4,824,742 | 4/1989 | Parry . |
| 4,853,301 | 8/1989 | Granata, Jr. et al. ............... 429/39 |
| 4,874,678 | 10/1989 | Reichner . |
| 4,876,163 | 10/1989 | Reichner . |
| 4,877,506 | 10/1989 | Fee et al. ..................... 429/30 X |
| 4,877,693 | 10/1989 | Baker . |
| 4,885,142 | 12/1989 | Suitor et al. . |
| 4,910,100 | 3/1990 | Nakanishi et al. . |
| 4,913,982 | 4/1990 | Kotchick et al. .................. 429/12 |
| 4,943,494 | 7/1990 | Riley . |
| 4,963,442 | 10/1990 | Marianowski et al. .............. 429/13 |
| 4,983,471 | 1/1991 | Reichner et al. . |
| 5,023,152 | 6/1991 | Akagi ............................ 429/32 |
| 5,045,413 | 9/1991 | Marianowski et al. . |
| 5,077,148 | 12/1991 | Schora et al. . |
| 5,079,105 | 1/1992 | Bossel . |
| 5,082,751 | 1/1992 | Reichner . |
| 5,175,062 | 12/1992 | Farooque et al. . |
| 5,186,806 | 2/1993 | Clark et al. . |
| 5,188,910 | 2/1993 | Ishihara et al. . |
| 5,227,256 | 7/1993 | Marianowski et al. .............. 429/16 |
| 5,238,754 | 8/1993 | Yasuo et al. ................... 429/39 X |
| 5,252,409 | 10/1993 | Akagi ............................ 429/32 |
| 5,269,902 | 12/1993 | Khandkar et al. . |
| 5,298,341 | 3/1994 | Khandkar et al. ................. 429/32 |
| 5,340,664 | 8/1994 | Hartvigsen ...................... 429/20 |
| 5,350,642 | 9/1994 | Akagi ............................ 429/32 |

OTHER PUBLICATIONS

Dokiya et al., "Train Cell Stack By Wet Fabrication Processes", IFCC The International Fuel Cell Conference, IV–B–6, pp. 309–312. Feb. 1992.

Primary Examiner—Stephen Kalafut
Attorney, Agent, or Firm—Trask, Britt & Rossa

[57] ABSTRACT

A fuel cell module (10) with multiple fuel cell stacks having generally planar cross-flow grooved interconnectors with fuel and air flow channels therein arranged in multi-stack columns (14, 16) wherein adjacent stacks are joined by manifold frames (24), and pairs of columns are spaced-apart across a central air plenum (28) in fluid communication with the air flow channels, and fuel flows serially through the stacks along the length of the column. In one embodiment, a series of such modules are configured into a multi-module system.

20 Claims, 4 Drawing Sheets

FUEL CELL MODULE

TECHNICAL FIELD

This invention relates generally to solid oxide fuel cell systems that electrochemically convert chemical energy from reactant gases into electrical energy, and more particularly to a compact, high-efficiency field cell module being easily manufactured and assembled.

BACKGROUND ART

Solid oxide fuel cell ("SOFC") systems convert chemical energy from reactant gases into electrical energy. Fuel gases such as $H_2$, $CO$, $CH_4$ or other hydrocarbon-containing gases combust with oxygen from air in a high-temperature electrochemical reaction occurring across ion-specific, solid oxide electrolyte plates. Electrolyte materials that are able to withstand the high-temperature process and are particularly suited for use in SOFC systems include $ZrO_2$, $CeO_2$ and $Bi_2O_3$. The electrolyte plates have an oxygen electrode (cathode) positioned on one face, and a fuel electrode (anode) positioned on the opposite face. Air is supplied to the oxygen electrode, and fuel gas is supplied to the fuel electrode. Oxygen from the air reacts at the cathode according to the equation:

$$O_2 + 4e^- \rightarrow 2O^{-2}$$

The oxygen anions produced at the cathode migrate through the ion specific electrolyte plate to the anode which is exposed to fuel gases. The reaction at the anode is shown in equations:

$$H_2 + O^{-2} \rightarrow H_2O + 2e^-$$

and $$CO + O^{-2} \rightarrow CO_2 + 2e^-$$

An electric current may be obtained by electrically connecting the anode and cathode due to the current flux of electrons involved in the electrochemical reaction. The overall reaction is shown in the equations:

$$O_2 + 2H_2 \rightarrow 2H_2O$$

$$O_2 + 2CO \rightarrow 2CO_2$$

Typical SOFCs include a plurality of electrolyte plates arranged into stacks where adjacent plates in a stack are separated by interconnectors that permit reactant gases to flow between the plates and contact the electrodes. The planar interconnectors are sized and shaped to resemble the planar electrolyte plates, but have opposing grooved surfaces; the grooves on one face are typically oriented 90° or perpendicular to the grooves on the opposite face. This arrangement (referred to as a cross-flow geometry) permits the flow of fuel gases through one set of grooves, while air flows through the other set of grooves oriented on the 90° orthogonal axis. In this manner, fuel and air flow through the electrolyte plates of the fuel cell stack at 90° angles. The interconnectors contact the electrolyte plates around their perimeter and along the ridges of the grooves. Reactant gases flowing through the grooves are in fluid communication with the electrodes on the surface of the electrolyte plates.

A gas-tight seal between the interconnectors and the electrolyte plates, particularly around the perimeter is very important to prevent the gases flowing on opposite sides of the interconnector from mixing. At the high operating temperature of a SOFC (800°–1000° C.), if air is permitted to mix with the fuel stream, the electrochemical reaction intended to occur across the electrolyte plate occurs chemically in the fuel stream instead. The reaction and products are the same, but the electrical current flow between the anode and cathode does not occur. The efficiency of the SOFC is thus seriously compromised.

The problem of air/fuel mixing is particularly severe when the SOFC stacks are manifolded conventionally to supply reactant gases to the interconnector grooves. The manifolds are positioned over the openings to the interconnector grooves at four sides of the stack; the ends of the stack are comprised of electrolyte plates. Here, a gas-tight seal is required between the manifolds and the stack along each of the twelve edges of the stack. Since each stack of a multi-stack SOFC must be manifolded and plumbed individually, a substantial opportunity exists for gas-leaks to occur. Further, differences in the thermal expansion coefficients between the materials used for the electrolyte plates, interconnectors, and manifolds serve to further compound the leakage problem. Thermal stress resulting from thermal expansion mismatched components can lead to leaks around the edges of the manifold and at the seams between the electrolyte plates and the interconnectors.

Attempts have been made to prevent the problem of gas-leakage between the fuel and air streams. Construction of the SOFC components from the same materials, or from materials having similar thermal expansion coefficients has decreased the possibility of a gas-leak occurring. However, the manifolds are still difficult to apply and inspect, and a separate manifold is still required for every stack. In a multi-stack system, the manifolds contribute significantly to the volume to weigh ratio of a SOFC system.

Another method of reducing gas leaks is to assemble a plurality of stacks into a module which is then manifolded for the reactant gas streams. In one arrangement, the stacks are positioned around a central air plenum that supplies air to all the adjacent stacks. Several modules may be combined to obtain greater power output, but the modules are sealed together and the assembly still has the same manifolding arrangement. Although the modular SOFC concept (see U.S. Pat. No. 5,269,902) provides some improvement in volume to weight ratio, it too has some drawbacks. The modules are difficult to construct, and can be quite large to accommodate multiple stacks. The individual modules must be sealed to one another which is difficult with large modules. Individual stacks in a module also need to be sealed simultaneously to the module framework, which becomes difficult as the number of stacks increases. Tight stack and manifold tolerances are also required to obtain a good seal of all stacks, which further contributes to the difficulties encountered in construction of SOFC modules.

Notwithstanding these and other difficulties, modular SOFC systems offer several advantages. The electrical generating capacity of a SOFC system can be increased without a corresponding increase in gas manifolding components. Several modules may be stacked together and the manifolds attached to the ends of the modular structure. Air is supplied to the central air plenum which extends through each module in the structure. Thus, a separate manifold is not required for each module in the structure. Some modular SOFC systems also facilitate series flow of fuel gases through consecutive fuel cell stacks in the modules which improves the fuel efficiency of the SOFC system.

A need exists for a compact, high-efficiency fuel cell module having improved manufacturability. The module components should be easy to manufacture and assemble using conventional methods. The module should also be compact to provide improved volume to weight ratio without sacrificing electrical generating capacity. Further, the module should provide improved sealing characteristics to avoid gas-leaks between the fuel and air streams.

DISCLOSURE OF THE INVENTION

The invention includes a dual column fuel cell module that obviates many of the previously identified problems associated with fuel cells and fuel cell modules. The module is compact and has fewer components which reduces the volume to weight ratio. Further, the module's design is easier to manufacture and assemble than are existing modules. The design also provides improved sealing of individual stacks to the manifold, and provides fewer opportunities for gas-leaks to occur.

The dual column fuel cell module includes two columns of multiple fuel cell stacks comprised of planar cross-flow interconnectors sandwiched between solid oxide electrolyte plates. The stacks are arranged adjacent in each column to provide series fuel flow through the fuel flow channels in all stacks in a column. In one embodiment, the columns are placed on theft side. Adjacent stacks in a column are joined by manifold frames that have a mating geometry to facilitate joining of the stacks. One side of a stack is mated to each side of the manifold frame, and the stacks and frames are sealed together to form a strong, gas-tight seal between adjacent stacks. Manifold frames may also be sealed to ends of the columns to facilitate sealing the columns to the module housing. The manifold frames are easily applied and can be easily inspected for leaks. Fuel flow is sequential through the fuel passageways in each successive stack in a column.

The inlets to the air passageways in the stacks comprising a column are all oriented on one face of the column. The columns are then oriented in the module so that the face of each column having the air inlets face each other and are spaced-apart across a central air plenum. The two columns of stacks form two sides of the central air plenum, and flat plates spanning the gap between the spaced-apart columns form two additional sides of the plenum. The plenum has a closed end and an open end structured to receive air from an air manifold. Air supplied to the central air plenum flows outwardly through each of the air flow channels in the interconnectors between the electrolyte plates.

Series fuel flow through multiple fuel cell stacks in a SOFC system increases the efficiency of the system. Approximately 20–25% of the energy value of the fuel is utilized upon passage of the fuel through each of 3 fuel cell stacks. If the partially spent fuel is subsequently fed to a fuel cell stack located downstream, a portion of the remaining energy value of the fuel may be utilized by the downstream stacks. Fuel efficiency may be further increased by mixing the partially spent fuel exhausted from the fuel channels of the preceding stacks before it flows to subsequent stacks. Fresh fuel may also be mixed with the partially spent fuel and reformed before it flows to subsequent stacks. Fuel reformation involves chemical conversion of a portion of the fuel from the difficult to react larger molecules and species to more electrochemically reactive chemical species. Accordingly, the fuel cell reaction is facilitated and the efficiency of the fuel cell is enhanced. The reformation process requires addition of steam to the fuel. The electrochemical reaction in the fuel cell stack produces steam as a reaction product. Thus, additional fuel can be fed directly to the interstage area where the reaction product from the upstream will reform the fuel. The endothermic reaction of reformation can be used to control temperature. The dual column fuel cell module is particularly suited to provide fuel reformation capabilities as materials for reforming the fuel may be disposed within the manifold frames connecting adjacent fuel cell stacks. The ease of assembly of the manifold frames to the fuel cell stacks results in easier manufacturing of a fuel cell module having fuel reforming capability.

Multiple spaced-apart columns may be arranged in rows, each row comprising a pair of spaced-apart columns of multiple fuel cell stacks in the disclosed dual column arrangement. The electrical power capacity of a fuel cell system can thus be increased according to the requirements of a particular application. If additional power capacity is desired, multiple fuel cell modules, each module having a plurality of fuel cell stacks, may be connected to deliver the desired electrical power level.

In one embodiment, the fuel cell module includes a heat exchanger for preheating incoming reactant gases. Hot fuel and air gases exhausted from the fuel cell stacks are directed to flow through or over the heat exchanger where the thermal energy from the exhaust gases is transferred to preheat incoming gases.

BRIEF DESCRIPTION OF THE DRAWINGS

In the drawings, which depict presently preferred embodiments of the invention, and in which like reference numerals refer to like parts in different views.

BEST MODE OF THE INVENTION

Figure 1:
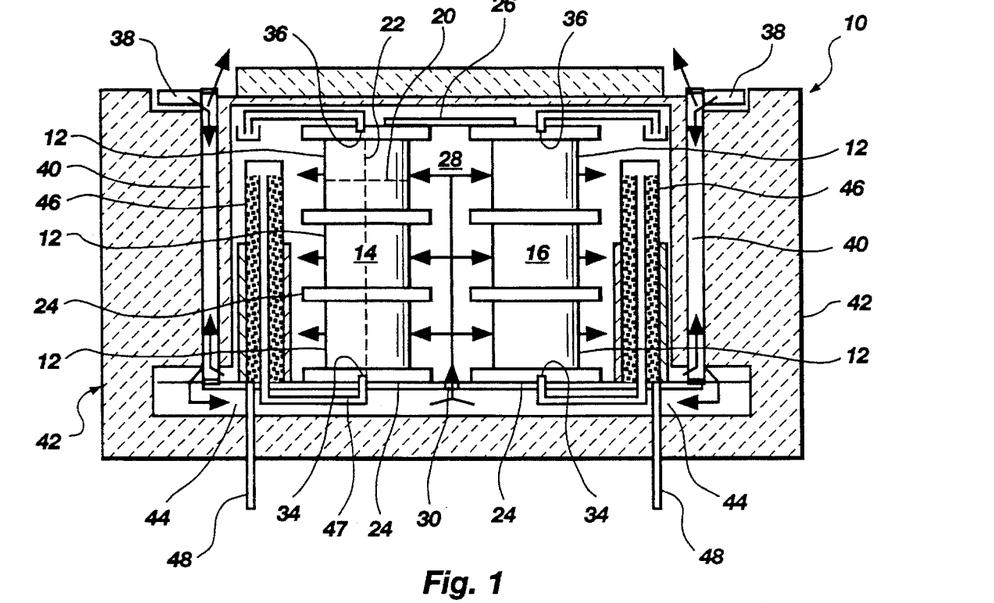
FIG. 1 is an elevated view of a dual column fuel cell module embodying features of the instant invention.
Figure 2:
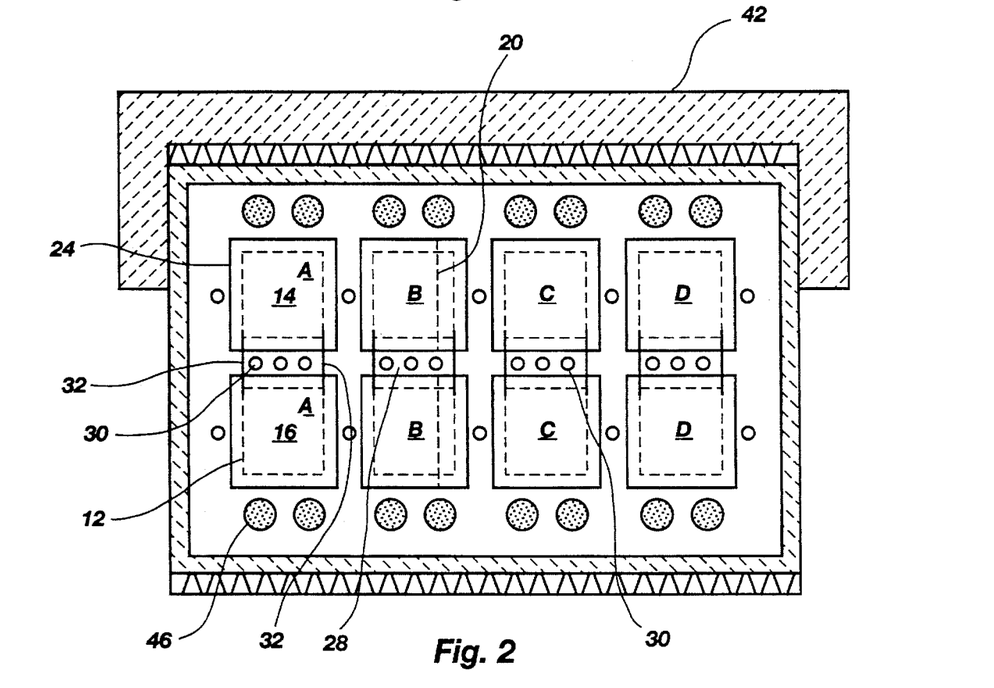
FIG. 2 is a plan view of a dual column fuel cell module having extended electrical capacity from a plurality of fuel cell stacks arranged according to the instant invention.
Figure 3:
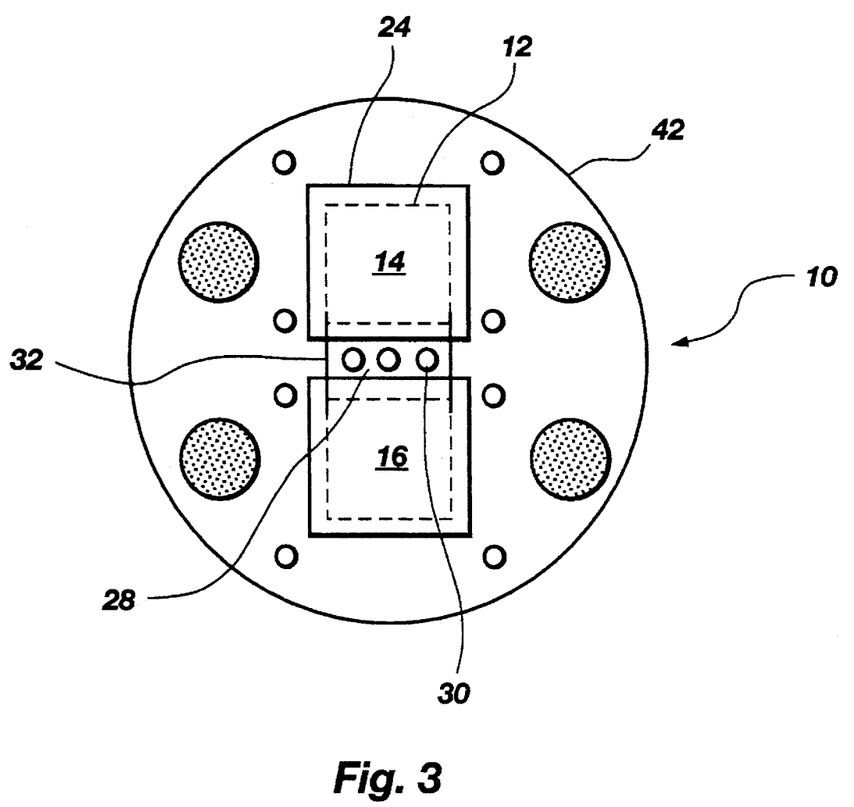
FIG. 3 is plan view of another embodiment of a dual column fuel cell module according to the invention.

Referring to FIGS. 1 and 2, a dual column fuel cell module, generally 10, includes a plurality of planar solid oxide electrolyte plates arranged into stacks 12 in spaced-apart columns 14 and 16. The electrolyte plates may be constructed from solid oxide materials such as $ZO_2$, $CeO_2$ or $Bi_2O_3$ useful in high-temperature fuel cell systems. Each electrolyte plate has an air face with an oxygen electrode (cathode) (not shown) affixed thereto, and a fuel face on the opposite side of the plate with a fuel electrode (anode) (not shown) affixed thereto. Preferably, successive electrolyte plates are separated from adjacent plates by cross-flow grooved interconnectors. One set of interconnector grooves forming air flow channels are oriented along the axis of the horizontal dotted line indicated by reference numeral 20. The grooves on the opposite side of the interconnector forming fuel flow channels are oriented along the axis of the dotted line indicated by reference numeral 22. This arrangement provides for flow of reactant gases vertically and horizontally in a cross-flow manner through the electrolyte plates. Air flowing through the air flow channels oriented along the axis identified by dotted line 20 is in fluid communication with the oxygen electrodes, while fuel gases flowing through the fuel flow channels oriented along axis 22 are in fluid communication with the fuel electrodes.

Adjacent stacks are sealed to generally planar manifold frames 24 that permit reactant gases flowing along axis 22 to flow in series through successive stacks. The manifold frames 24 have a mating geometry with respect to the stacks that enables a stack 12 to be joined to either side of each frame. Multiple stacks may be joined together into a column 14, 16 using the manifold frames 24, and are sealed to the manifold frames 24 with sealing material such as glass. The manifold frames are easily applied to the stacks, and their design allows for convenient inspection of the seal to identify gas-leaks between the stacks and frames. Manifold frames may also be sealed to the ends of the columns as their configuration facilitates improved sealing of the columns into the module 10.

Columns 14 and 16 are spaced-apart and sealed at their ends to the module housing 42. The columns 14, 16 form two walls of a central air plenum 28 that functions to receive and contain air flowing into the plenum through plenum inlets 30 before flowing out through the air flow channels between the electrolyte plates. The distance between the columns may be chosen to suit the air flow requirements for the module and this distance typically varies from to ½ inch to 2 inches.

A pair of flat plenum plates 32 (FIG. 2) extending between the columns form the remaining two sides of the air plenum, and an end plate 26 extending between the columns closes off the end of the plenum. Since an adequate volume of air-flow through the plenum is the only requirement for the distance columns 14 and 16 are spaced apart, the dual column fuel cell module may be made more compact than other fuel cell modules of similar power capacity.

The central air plenum need only be large enough to handle sufficient air flow requirements to the stacks comprising the columns. This feature of the dual column fuel cell module is in contrast to other SOFC modules having multiple stacks arranged around a central air plenum. In the latter arrangement, the minimum size of the central plenum is determined not by air flow requirements, but by how close the stacks can be positioned with respect to each other around the plenum. For example, if six stacks are included around the plenum, the plenum can only be as small as the space in the center when the stacks are arranged edge-to-edge around the plenum. This arrangement can result in excess volume for the air plenum, and a corresponding larger volume to weight ratio for the module. By contrast, a six stack embodiment of the instant invention includes two spaced-apart columns having three stacks each that are positioned only as far apart as necessary to provide adequate air flow to the stacks. The air plenum is thus smaller which reduces the size of the module.

A significant advantage of the dual column fuel cell module is the improved sealing of the fuel cell stacks to the module housing. Using the previously identified six-stack example, some SOFC modules require that each end of the six stacks, a total of 48 edges, be sealed to the module framework. Such an arrangement requires considerable effort to properly align each stack with the ports allowing gases to flow through the stacks. Once sealed, the seams are difficult to inspect and repair if necessary. A six-stack embodiment of the dual column fuel cell module has only 16 edges to seal to the module housing. Further, if manifold frames are included at each end of the columns, the seals may be made between the manifold frames and the module housing. Since the manifold frames may be configured to provide improved sealing characteristics, a characteristic not possessed by electrolyte plates, the seals are easier to apply and inspect, and are subject to increased integrity and reliability.

Fuel gases (e.g. hydrogen) flow serially through the fuel flow channels of the interconnectors between the electrolyte plates of successive stacks. Fuel gases enter the fuel flow channels through fuel inlets 34 disposed proximal to a manifold frame 24 at one end of the column. The fuel gases then flow serially through the stacks of electrolyte plates in each column and are exhausted through fuel exhaust outlets 36.

As depicted in FIG. 1, the fuel gas may be first passed through a reformer 46 connected to the inlet by conduit 47. The fuel gas enters the reformer 46 through conduit 48. Reformers are used when a hydrocarbon such as natural gas, desulfurized natural gas, methanol, petroleum or coal gas is used as the fuel source.

The fuel exhaust outlets may also be connected to an associated heat exchanger to transfer heat from the hot fuel exhaust gases to preheat the cooler incoming reactant gases. Likewise, fuel inlets 34 may be associated with an associated heat exchanger delivering preheated fuel gases to the fuel flow channels. Incoming fuel gases may be fed to the heat exchanger through associated fuel piping. Since thermodynamic analysis shows that SOFC efficiency may be increased by series fuel flow to multiple stacks, the dual column fuel cell module may employ this fuel flow scheme to achieve greater efficiency from the module.

The air flow pathway through the module is shown by the solid-headed arrows in FIG. 1. Air enters the module through air inlets 38, and may be preheated by the previously described associated heat exchanger before flowing through the plenum inlet 30 in the central air plenum. The incoming air may also be preheated in air piping 40 associated with or embedded in the walls of the module housing 42 of the fuel cell module. The preheated air is then routed to a common air channel 44 where it flows through the plenum inlet 30 into the plenum. Hot air exhaust from the fuel cell stacks may also be used by a preheater to assist in preheating the cooler incoming fuel gases and air.

Referring now to FIG. 2, numerous spaced-apart columns of fuel cell stacks may be arranged in rows A through D to provide additional electrical capacity for a fuel cell system. Each row comprises a plurality of fuel cell stacks arranged in spaced-apart dual columns. Rows may be included according to the requirements of a particular application. Additional power capacity may be obtained by combining a plurality of fuel cell modules, each module having multiple fuel cell stacks.

The dual column fuel cell module is particularly suited for series fuel flow through a plurality of fuel cell stacks. Thermodynamic analysis shows that SOFC efficiency may be increased by series fuel flow to multiple stacks. Fuel utilization by a stack typically ranges from 20 to 35%, depending on the number of stacks in series, and the unspent portion may be utilized by subsequent stacks downstream.

In the series fuel flow arrangement, reforming partially spent fuel gases exhausted from an upstream stacks before the gases are fed to a downstream stack serves to improve fuel utilization. Fuel reformation is typically accomplished by a reforming catalyst that converts product steam from the fuel cell reaction and fresh hydrocarbon fuel into CO and $H_2$ which are used by the cell. Thus, the fuel cell reaction thermodynamics are urged toward formation of product because of constant consumption of the product. In contrast to the reformers 46 of the dual column fuel cell module depicted in FIG. 1, the fuel reforming catalyst could be contained in the manifold frames disposed between adjacent stacks. The manifold frames may be easily adapted to contain the reforming catalyst, and are easily connected to the fuel cell stacks. Construction of a series fuel flow fuel cell module is thus significantly less difficult with the disclosed invention.

EXAMPLE

A 1 kW dual column fuel cell module as depicted in FIG. 1 was made. The module had six cube stacks (4" (approx. 10 cm)) incorporated into two columns 14, 16 with three stacks in each column. The stacks in one column had metal interconnectors, while the stacks in the other column had ceramic interconnectors. The columns were placed in an outer housing 42 made of Inconel (Inco Alloys of Canada). Heat exchangers were incorporated into the module housing 42, as was insulation, to heat the air coming from the air inlet 38. Reformers 46 containing a commercially available stream reforming catalyst (R-67-7H of Haldor Topsoe of Denmark) were used. The fuel gas was desulfurized natural gas.

In order to test the concept of multistage fuel oxidation using a column of solid oxide fuel cell stacks, a two stage stack test was conducted. The column consisted of two 9 cell stacks with a cell area of 5 cm×5 cm and an electrode active area of 22 $cm^2$/cell. The cell consisted of 150 to 180 micrometer thick electrolyte made of yttria stabilized zirconia, 15 to 25 micrometer thick Strontium doped Lanthanum Manganite cathode, and, 25–40 micrometer thick Nickel cermet anode. The interconnects used in this test are made of a metal alloy. The fuel, $H_2$ humidified with water by bubbling through a reservoir of water at room temperature to give approximately 3% water vapor, is fed through one end of the column, and after passing through both stacks in a series manner, exits at the other end of the column. Between the two stacks, the manifold provides adequate volume and a diffuser plate to provide thorough mixing of the fuel from various channels of the upstream stack before the fuel enters the downstream stack. The fuel flow rate for the test was maintained at 2 liters per minute. This flow rate corresponds to approximately 33% fuel utilization at 10 Amperes current from one stack. The fuel flow rate can be adjusted to achieve the desired fuel efficiency (utilization) at the stack operating point. The air was manifolded to have parallel flow to each stack, i.e., the air flow has a single pass through each of the stack and the air flow was maintained at 28.7 liters per minute. The air flow rate can be adjusted to achieve the desired cooling required for the stack and/or the air exhaust temperature required for the heat exchanger and/or to meet the additional power producing thermal cycle needs.

Figure 4:
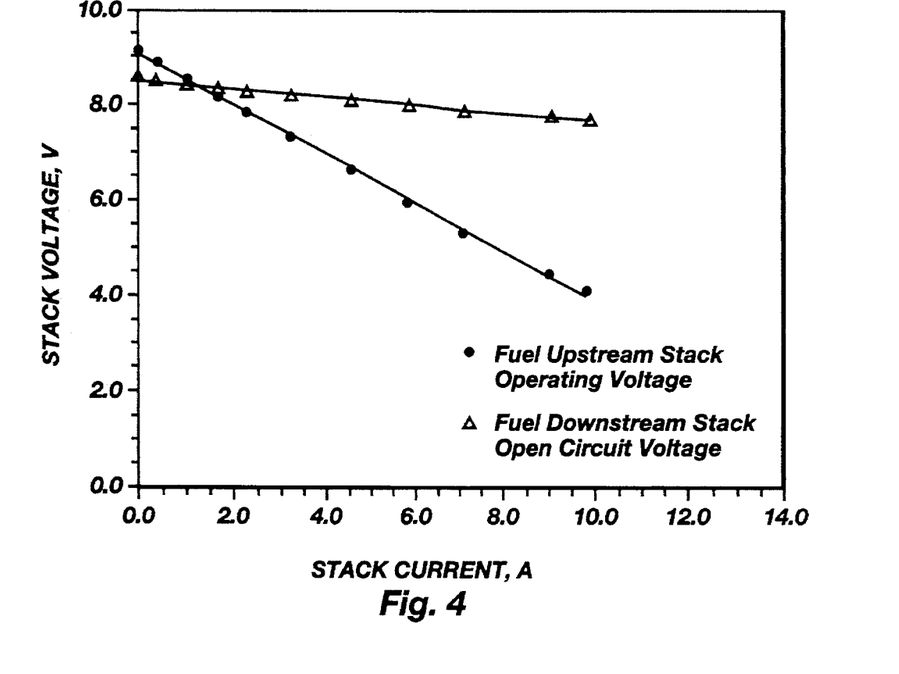
FIG. 4 is a graph depicting the stack performance characteristics of a single column two stage fuel cell stack configuration (upstream stack under load and downstream stack under open circuit condition.)
Figure 5:
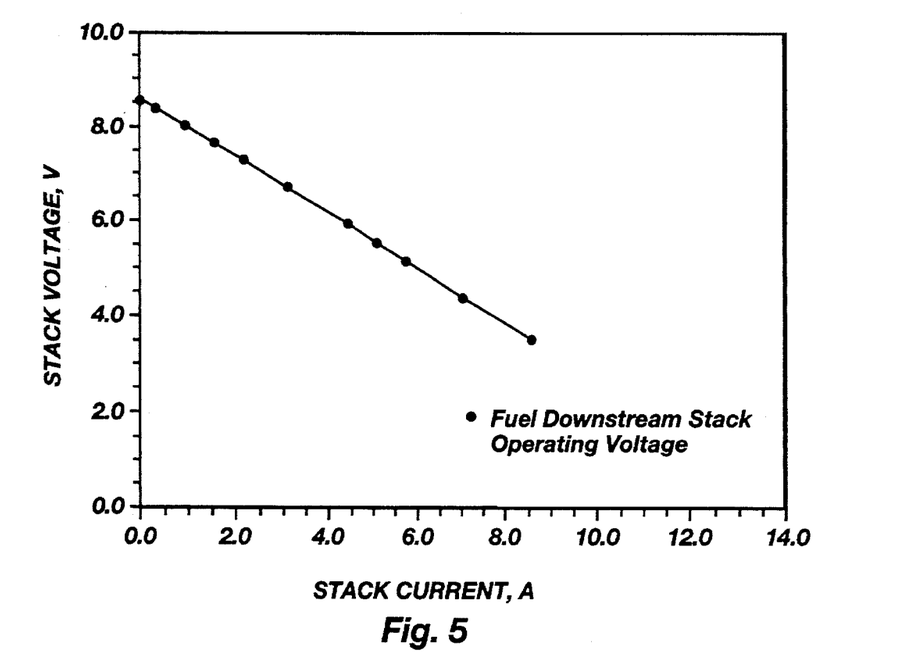
FIG. 5 is a graph depicting the stack performance characteristics single column two stage fuel cell stack configuration (downstream stack under load).
Figure 6:
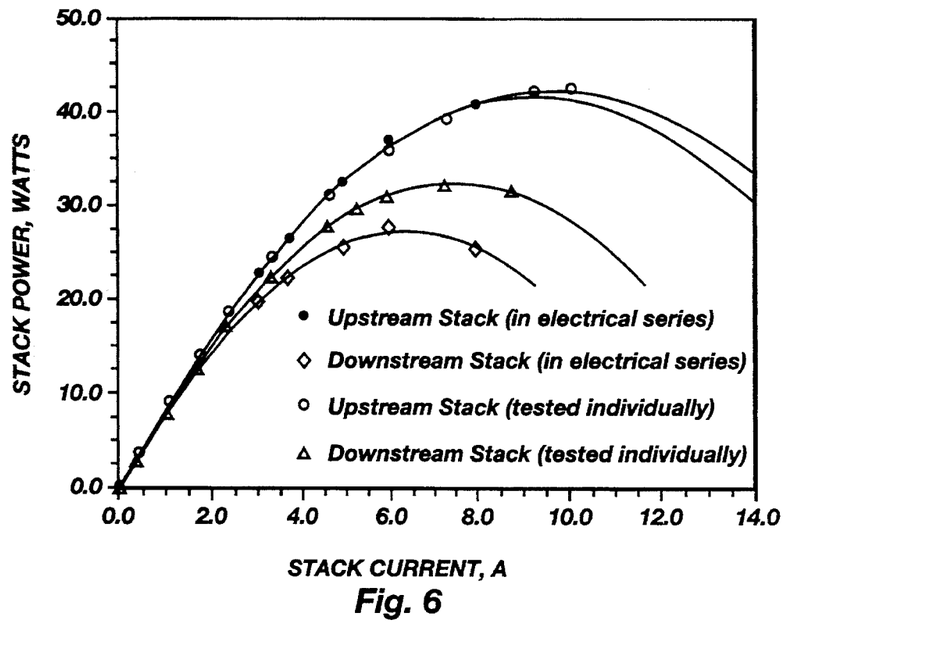
FIG. 6 is a graph comparing stack performance characteristics when loaded individually and when loaded in electrical series (singe column two stacks configuration).
Figure 7:
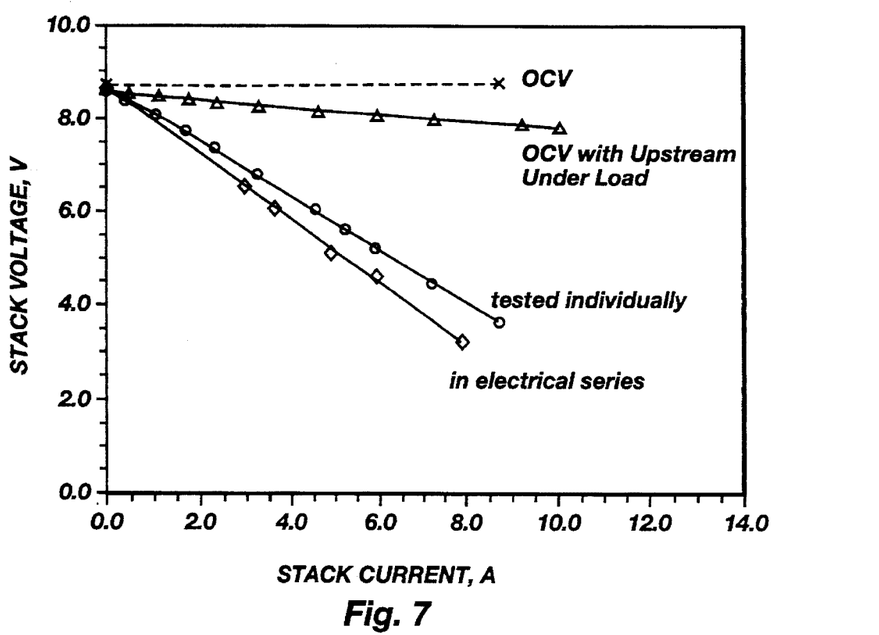
FIG. 7 is a graph comparing the downstream stack performance of an individual test versus an electrical series test.

The stack performance test consisted of testing the two stacks in electrical series and of testing each of the stacks individually. The stacks can also be connected in parallel electrically to meet the desired current-voltage specifications. The performance of the upstream stack which received fresh fuel is shown in FIG. 4. Also shown in FIG. 4 is the voltage of the downstream stack under no load (open circuit) condition. The initial voltage of the downstream stack is about 0.5 Volt lower than the upstream stack possibly due to some leakage. However, as the electrical load on the upstream stack is changed to increase its current output, the open circuit voltage of the downstream stack lowers, as expected from thermodynamic analysis, due to the partial utilization of the fuel in the upstream stack. The lower open circuit voltage corresponds to the average composition of the fuel exhaust from the upstream stack. This illustrates that the downstream stack maintains a high driving force (open circuit potential) even though the upstream stack has an operating potential that is considerably lower. In the present example, the operating voltage of the upstream stack at 10 Amperes current is 4 Volts while the open circuit potential of the downstream stack is 7.5 Volts. FIG. 5 shows the performance of the downstream stack when tested individually. In this test, the upstream stack is not under electrical load and it functions only as the conduit for the fresh fuel to the downstream stack. The performance of this stack is comparable to that of the upstream stack with an offset corresponding to the lower open circuit voltage. In FIG. 6, the power output of the two stacks are shown under different operating conditions, namely, the two stacks tested individually and tested in electrical series. The upstream stack, which receives fresh fuel under both conditions, shows identical performance characteristics as expected. The downstream stack shows higher performance when tested individually, i.e., when receiving fresh fuel and shows a lower performance when tested in electrical series with the upstream stack, i.e., when receiving partially utilized fuel. The lower performance of the downstream stack when tested in electrical series with the upstream is due to the lowering of the open circuit potential as illustrated in FIG. 7. The shift in the performance curve nearly corresponds to the shift in the open circuit voltage. The combined fuel utilization of the two stacks at 10 Amperes current in the present example is 66%. If one stack had been operated at a fuel utilization of 66%, the performance would be lower than the combined performance of the two stacks each operating at 33% fuel utilization, illustrating the benefit of the multistage oxidation.

What is claimed is:

1. A fuel cell module comprising:

a module housing for containing components of said fuel cell module therein and for attaching components of said fuel cell module thereto;

a plurality of fuel cell stacks disposed within said module housing, said fuel cell stacks comprising a plurality of interconnectors alternately sandwiched between a plurality of planar electrolyte plates, said electrolyte plates having a fuel face with an anode associated therewith and an air face opposite said fuel face having a cathode associated therewith, said interconnectors having a first surface with fuel flow channels therein sealed to, and in fluid communication with, the fuel face of an adjacent electrolyte plate and a second surface opposite said first surface with air flow channels therein sealed to, and in fluid communication with, the air face of an adjacent electrolyte plate;

a plurality of hollow manifold frames joining and sealing multiple fuel cell stacks into columns thus channeling fuel flow through said fuel cell stacks in a column having air flow channels through said fuel cell stacks, and wherein pairs of said columns are spaced apart and arranged such that said air flow channels in each of said pairs of spaced-apart columns are in fluid communication;

a central air plenum comprising the space between said spaced apart columns and in fluid communication with said air flow channels in said columns, said plenum having two walls comprised of said spaced-apart columns and two walls comprised of plenum plates extending between and sealed to said columns, said plenum having an open end and a sealed end and configured and arranged to receive air through the open end and distribute air to the air flow channels in said columns;

a fuel intake associated with said housing for supplying fuel gas to the fuel flow channels in said columns; and an air intake associated with said housing for supplying air to said open end of said air plenum.

2. The fuel cell module of claim 1 including a heat exchanger associated with said module housing for exchange of thermal energy from hot gases exhausted from said stacks to cooler incoming reactant gases.

3. The fuel cell module of claim 2 wherein said heat exchanger is embedded in the module housing.

4. The fuel cell module of claim 1 wherein fuel gases flow serially through the fuel flow channels in successive stacks in a column.

5. The fuel cell module of claim 4 further comprising a reformer for reforming partially spent fuel gas exhausted from a stack in said columns prior to flow of the fuel gas to a successive stack in said column.

6. The fuel cell module of claim 1 further comprising a plurality of said spaced-apart pairs of columns arranged in adjacent rows across a central air plenum.

7. The fuel cell module of claim 1 further comprising a plurality of said modules configured and arranged into a multi-module fuel cell system.

8. A fuel cell module comprising:

a module housing structured to contain components of the fuel cell module therein;

a plurality of plates, each said plate comprised of a solid oxide electrolyte and being planar with a fuel face having an anode associated therewith and an air face opposite said fuel face having a cathode associated therewith;

plurality of interconnectors sandwiched between successive plates and arranged into a plurality of stacks, said interconnectors having a first surface with fuel flow channels therein sealed to, and in fluid communication with, the fuel face of an adjacent plate and a second surface, opposite said first surface, with air flow channels therein sealed, to and in fluid communication with air face of an adjacent electrolyte plate;

a plurality of hollow manifold frames disposed between the stacks for joining and sealing the stacks together into a plurality of columns wherein the fuel flow channels in said stacks in a column are in fluid communication with, and extend along a length of, said column, and said air flow channels through the stacks are oriented along a width of the columns, a pair of said columns being spaced apart across a central air plenum having two walls comprising the spaced-apart columns and two walls comprising plenum plates extending the spaced-apart columns, said plenum being in fluid communication with the air flow channels and having a closed and open ends;

a fuel intake associated with said housing for supplying fuel gases to the said columns; and an air intake associated with said housing for supplying air to the open end of said central air plenum.

9. The fuel cell module of claim 8 further comprising a heat exchanger associated with said module housing for exchange of thermal energy between hot gases exhausted from said stacks and cooler incoming reactant gases.

10. The fuel cell module of claim 9 wherein said heat exchanger is embedded in the module housing.

11. The fuel cell module of claim 8 wherein fuel gases flow serially through said fuel flow channels in successive stacks in said columns.

12. The fuel cell module of claim 8 further comprising a reformer for reforming partially spent fuel gas exhausted from a column prior to flow of the fuel gas to a successive column.

13. The fuel cell module of claim 8 further comprising a plurality of pairs of spaced-apart columns arranged in adjacent rows across said central air plenum.

14. The fuel cell module of claim 8 associated with other such modules configured and arranged into a multi-module fuel cell system.

15. A fuel cell module having a module housing containing a plurality of spaced-apart columns comprised of stacks of interconnectors having fuel flow channels and air flow channels therein sandwiched between solid oxide electrolyte plates having an anode and a cathode associated therewith, said stacks joined into said columns by manifold plates structured to mate with and join said stacks together wherein said fuel flow channels in a column are oriented along a longitudinal axis of the column and said air flow channels in a column are oriented along a horizontal axis of the column, and wherein pairs of said columns are spaced-apart across a central air plenum having two walls comprised of said columns and two walls comprised of a pair of plenum plates extending between said spaced apart columns, said air plenum in fluid communication with said air flow channels and having a closed end and an open end, said module including manifold means for supplying reactant fuel gas to said gas flow channels and air to said open end of said central air plenum.

16. The fuel cell module of claim 15 further comprised of a heat exchanger for preheating incoming fuel and air gases with thermal energy from hot exhaust gases.

17. The fuel cell module of claim 15 further comprised of a reformer for reforming partially spent fuel exhausted from one column prior to flow of said fuel gas to a successive column.

18. The fuel cell module of claim 15 further comprised of a plurality of said spaced-apart columns arranged in adjacent rows across said central air plenum.

19. The fuel cell module of claim 15 associated with other such modules configured and arranged into a multi-module fuel cell system.

20. An improvement in a solid oxide fuel cell module of the type having stacks of spaced apart solid oxide electrolyte plates separated by interconnectors having fuel and air flow channels therein, the improvement comprising:

arrangement of said stacks in columns comprised of stacks connected together with manifold frames configured to join two stacks end to end so as to provide series flow of fuel gases through successive stacks, and arranging a pair of said columns spaced-apart across a central air plenum such that the fuel flow channels are oriented along a length of said columns and said air flow channels extend away front said central air plenum.

* * * * *

UNITED STATES PATENT AND TRADEMARK OFFICE
CERTIFICATE OF CORRECTION

PATENT NO. : 5,480,738

DATED : January 2, 1996

INVENTOR(S) : Elangovan et al.

It is certified that error appears in the above-indentified patent and that said Letters Patent is hereby corrected as shown below:

In Column 1, line 9, change "field" to --fuel--;

In Column 3, line 27, change "theft" to --their--;

In Column 4, line 62, change "ZO$_2$" to --ZrO$_2$--; and

In Column 12, line 3, change "front" to --from--.

Signed and Sealed this

Sixteenth Day of April, 1996

Attest:

BRUCE LEHMAN

Attesting Officer

Commissioner of Patents and Trademarks